US010417612B2

(12) United States Patent
Gehrke et al.

(10) Patent No.: US 10,417,612 B2
(45) Date of Patent: Sep. 17, 2019

(54) ENHANCED SERVICE ENVIRONMENTS WITH USER-SPECIFIC WORKING SETS

(71) Applicant: Microsoft Technology Licensing, LLC, Redmond, WA (US)

(72) Inventors: Johannes Ernst Gehrke, Bellevue, WA (US); Eirik Knutsen, Oslo (NO); Øystein Torbjørnsen, Trondheim (NO); James Charles Kleewein, Kirkland, WA (US); Bård Kvalheim, Oslo (NO); Øivind Wang, Oslo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 60 days.

(21) Appl. No.: 14/096,908

(22) Filed: Dec. 4, 2013

(65) Prior Publication Data
US 2015/0154252 A1 Jun. 4, 2015

(51) Int. Cl.
G06Q 10/10 (2012.01)
G06F 16/90 (2019.01)

(52) U.S. Cl.
CPC ........... *G06Q 10/101* (2013.01); *G06F 16/90* (2019.01)

(58) Field of Classification Search
CPC ............... G06F 17/30864; G06F 17/30; G06F 17/30424; G06F 17/30867; G06Q 10/10
USPC ....................................................... 707/769
See application file for complete search history.

(56) References Cited

U.S. PATENT DOCUMENTS

| 5,768,510 | A   | * | 6/1998  | Gish ........................ G06F 9/54 |
|           |     |   |         | 709/202                                |
| 6,199,067 | B1  |   | 3/2001  | Geller                                 |
| 7,953,722 | B2  |   | 5/2011  | Tatzel et al.                          |
| 8,332,430 | B2  |   | 12/2012 | Koide et al.                           |
| 2002/0073236 | A1 | * | 6/2002 | Helgeson .......... G06F 17/30569 |
|           |     |   |         | 709/246                                |

(Continued)

FOREIGN PATENT DOCUMENTS

WO 2005/041100 A2 5/2005

OTHER PUBLICATIONS

"Data Federation Administration Tool Guide", Published on: Mar. 19, 2012, Available at: http://help.sap.com/businessobject/product_guides/boexir4/en/xi4_dfat_guide_en.pdf.

(Continued)

*Primary Examiner* — Hosain T Alam
*Assistant Examiner* — Nicholas E Allen
(74) *Attorney, Agent, or Firm* — Merchant & Gould

(57) ABSTRACT

Systems, methods, and software are disclosed herein for implementing enhanced search environments. In one implementation, an enhanced service environment includes a working set service that receives event signals initiated by working set agents in various application services. The working set agents communicate the event signals to nominate events occurring in the application services for inclusion in a working set of information specific to a user. The nominations may be based at least in part on a working set model specific to the user. In response to receiving the event signals, the working set service determines which of the events qualify for inclusion in the working set of information based at least in part on the working set model. For each event that qualifies for inclusion, the working set is modified to include at least the event.

20 Claims, 7 Drawing Sheets

(56) References Cited

U.S. PATENT DOCUMENTS

| | | |
|---|---|---|
| 2005/0183143 A1* | 8/2005 | Anderholm ............ G06F 11/32 726/22 |
| 2005/0226817 A1 | 10/2005 | Newman et al. |
| 2005/0228817 A1 | 10/2005 | Hochberg et al. |
| 2006/0265428 A1 | 11/2006 | Chai et al. |
| 2007/0168335 A1 | 7/2007 | Moore et al. |
| 2008/0133320 A1* | 6/2008 | Gluhovsky ............ G06Q 30/02 379/201.12 |
| 2008/0301084 A1* | 12/2008 | Demarest .......... G06F 17/30011 |
| 2009/0182836 A1* | 7/2009 | Aviles ................ H04L 41/0893 709/213 |
| 2010/0082695 A1 | 4/2010 | Hardt |
| 2010/0100930 A1* | 4/2010 | King .................. H04L 63/1433 726/1 |
| 2010/0192207 A1* | 7/2010 | Raleigh ............ G06Q 10/06375 726/6 |
| 2011/0035464 A1 | 2/2011 | Dolin et al. |
| 2011/0208822 A1 | 8/2011 | Rathod |
| 2011/0209159 A1* | 8/2011 | Baratz ............... G06F 17/30528 718/108 |
| 2011/0225123 A1* | 9/2011 | D'Souza ........... G06F 17/30312 707/634 |
| 2011/0225143 A1 | 9/2011 | Khosravy et al. |
| 2011/0256203 A1 | 10/2011 | Kim et al. |
| 2011/0258203 A1 | 10/2011 | Wouhaybi et al. |
| 2011/0276396 A1* | 11/2011 | Rathod ............. G06F 17/30867 705/14.49 |
| 2012/0016858 A1* | 1/2012 | Rathod ............. G06F 17/30867 707/706 |
| 2012/0072425 A1 | 3/2012 | Yaseen et al. |
| 2012/0110672 A1* | 5/2012 | Judge ..................... H04L 51/12 726/25 |
| 2012/0197686 A1* | 8/2012 | Abu El Ata ..... G06Q 10/06393 705/7.39 |
| 2012/0215911 A1* | 8/2012 | Raleigh ................... H04L 12/14 709/224 |
| 2013/0036109 A1 | 2/2013 | Kulick et al. |
| 2013/0036117 A1* | 2/2013 | Fisher ............... G06F 17/30041 707/736 |
| 2013/0097320 A1* | 4/2013 | Ritter ..................... G06Q 10/06 709/226 |
| 2013/0104236 A1* | 4/2013 | Ray ..................... H04L 63/1408 726/25 |
| 2013/0132566 A1* | 5/2013 | Olsen .................... H04W 4/025 709/224 |
| 2013/0204738 A1* | 8/2013 | Artun ................. G06Q 30/0631 705/26.7 |
| 2013/0215125 A1* | 8/2013 | Mahajan ........... H04M 1/72569 345/522 |
| 2013/0254402 A1* | 9/2013 | Vibhor .................... H04L 47/70 709/226 |
| 2013/0290344 A1* | 10/2013 | Glover ................ G06F 17/3053 707/741 |
| 2013/0311508 A1* | 11/2013 | Denker .................. G06F 3/013 707/769 |

OTHER PUBLICATIONS

"Overview of Security Trimming, Administrative Policies, and Privacy Settings for Social Feeds in SharePoint Server 2013", Published on: Mar. 26, 2013, Available at: http://technet.microsoft.com/en-us/library/dn167721.aspx.

"International Search Report and Written Opinion Received in PCT Application No. PCT/US2014/067516", dated Aug. 26, 2015, 15 pages.

Search Report Issued in European Patent Application No. 14819172.9, dated May 31, 2017, 8 pages.

"First Office Action Issued in Chinese Patent Application No. 201480066399.1", dated Sep. 29, 2018, 12 pages.

* cited by examiner

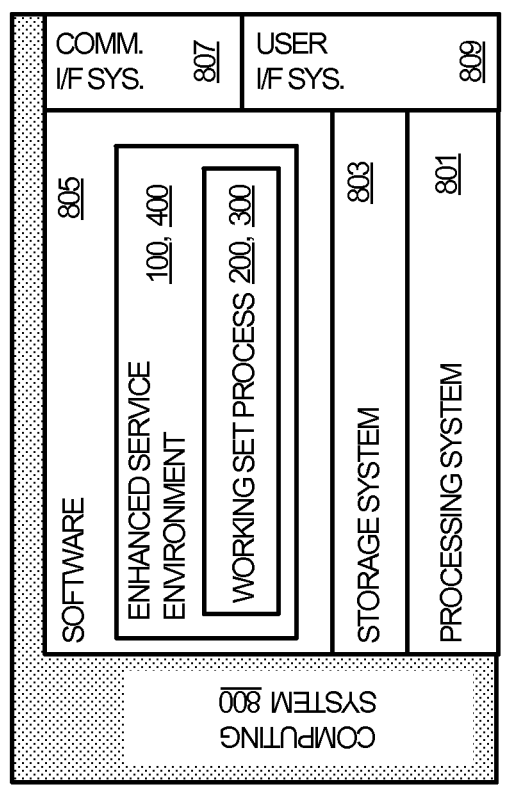

ENHANCED SERVICE ENVIRONMENTS WITH USER-SPECIFIC WORKING SETS

TECHNICAL FIELD

Aspects of the disclosure are related to computing hardware and software technology, and in particular to service environments enhanced by working sets.

TECHNICAL BACKGROUND

In many situations today, users interact with very large volumes of information as they perform tasks and complete work. The information may be spread across many different application services in many different forms. For example, a user may interact with documents, spreadsheets, presentations, contacts, and databases through any of a variety of applications, including productivity applications, email, file systems, and database applications. In addition, users interact with and exchange information over instant messaging conversations, online meetings, blogs, and other popular communication tools.

Many applications provide search tools with which users can retrieve specific items from large volumes of content. For example, most email clients provide a search tool for searching a user's mailbox for relevant emails. In another example, a file system interface can be used to search for files on a user's computer. Such content repositories are usually crawled continuously or periodically and indexed to facilitate more efficient searching. On a very large scale, Internet search engines attempt to crawl and index all or most of the content available on the web.

At the enterprise level, providing fast and reliable search services for a wide variety of content produced by a large set of users and applications has proven very challenging. But at the same time, enterprise users have become accustomed to the fast response times of local search tools and Internet-scale search tools and, in fact, have integrated many related search habits into their daily work. A variety of solutions have been developed that attempt to provide a similar experience across the enterprise space.

One enterprise search solution provides a search interface through which a query may be entered. The query is then distributed to multiple enterprise applications for the applications to conduct application-specific searches in their domain. The results can be aggregated and surfaced to a user. In another example, searches may be personalized such that a working context or other information specific to a user is considered during the search, thereby narrowing the results to something more relevant to the user. In addition, graph search has become an increasingly popular tool for searching large amounts of information.

OVERVIEW

An enhanced service environment and associated systems, methods, and software are disclosed herein or facilitating enterprise search by way of user-specific working sets. In at least one implementation, an enhanced service environment includes a working set service that receives event signals initiated by working set agents in various application services. The working set agents communicate the event signals to nominate events occurring in the application services for inclusion in a working set of information specific to a user. The nominations may be based at least in part on a working set model specific to the user. In response to receiving the event signals, the working set service determines which of the events qualify for inclusion in the working set of information based at least in part on the working set model. For each event that qualifies for inclusion, the working set is modified to include at least the event.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 8 illustrates a computing system representative of any system or systems suitable for implementing an enhanced service environment and associated processes.

TECHNICAL DISCLOSURE

Figure 1:
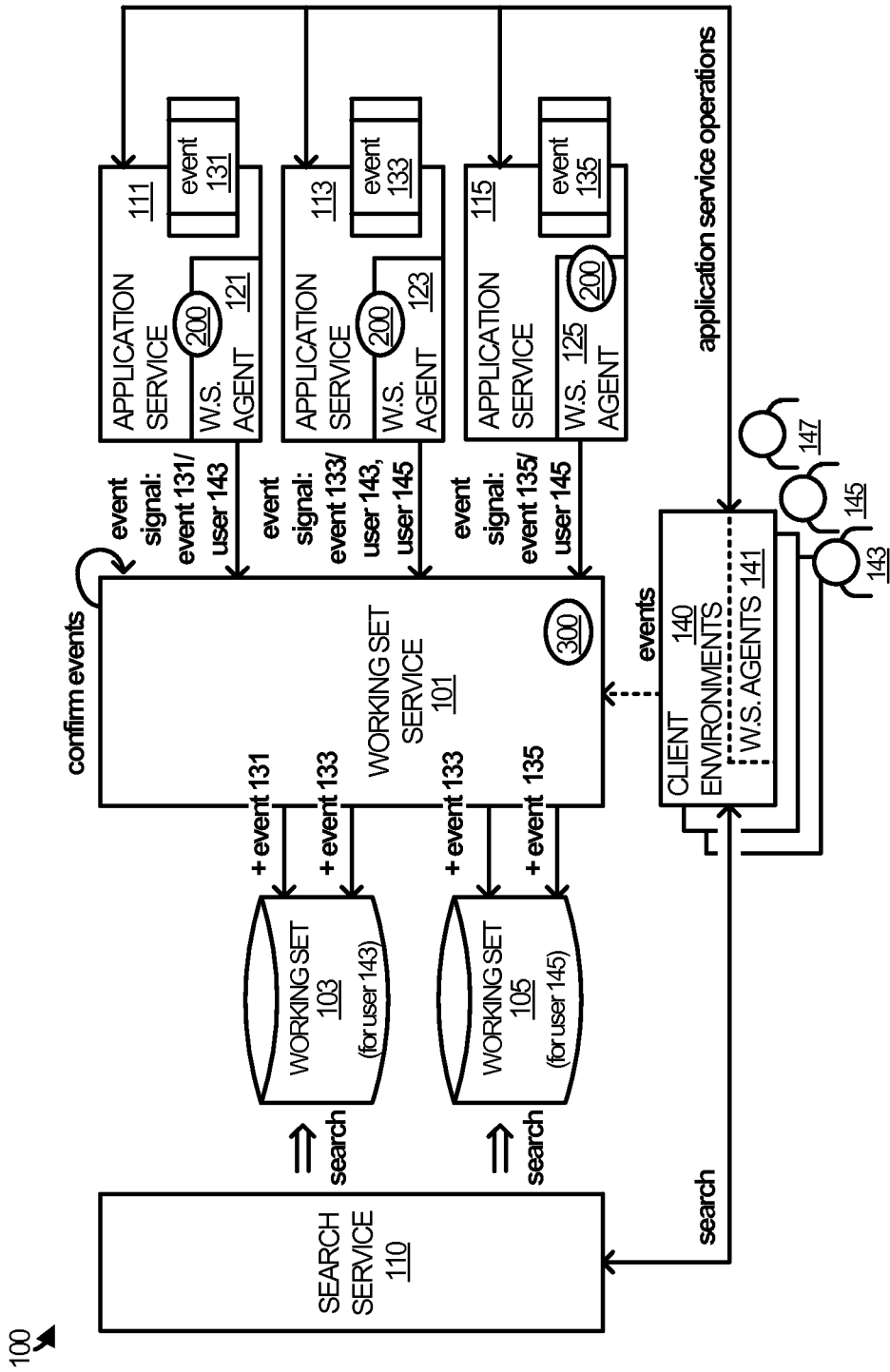
FIG. 1 illustrates an enhanced service environment in an implementation.

Implementations disclosed herein refer to enhanced service environments for facilitating user-specific working sets of information that can be searched for content relevant to a query. The personalized working sets may contain information that matters to a user in the relative near-term that may be associated with multiple different application services with which the user interacts.

The user-specific working sets may be assembled on a per-user basis by the interaction of working set agents, deployed in various application services, with a working set service that maintains the user-specific working sets. Search queries initiated from any search source may be directed at least partly to a user-specific working set. Since the user-specific working set is assembled with a specific user in mind, the speed with which search results are returned and their relevance may be improved.

In addition, the working-set model may be shaped based on the user's behavior across multiple application services. Actions or operations engaged in by the user in one application service can impact the working set model specific to that user as it is applied in another application service. In other words, the working set model is can be applied across multiple application services, not just one application service.

In one implementation, a working set service receives event signals initiated by the working set agents in the various application services. The working set agents communicate the event signals to nominate events occurring in the application services for inclusion in a working set of information specific to a user. The nominations may be based at least in part on a working set model specific to the user. In response to receiving the event signals, the working set service determines which of the events qualify for inclusion in the working set of information based at least in part on the working set model. The working set is then modified to include each qualifying event.

The working set of information in some scenarios may include a content database in which the content associated with an event may be stored, as well as other content associated other events included in the working set of information. The content can be indexed in a search index to the content database to facilitate searching. Security checks can be performed with respect to the content as it is retrieved from a content source for inclusion in a working set, as opposed to performing a security check when a particular item is selected from within a grouping of search results. For example, a security check can be performed to determine if the user is allowed to access the content prior to including it in the working set.

The working set of information may also include a graph index to a social graph of a user. In such scenarios, modifying the working set of information to include the event may include modifying the working set to include the event in the social graph. The event may be indexed in the graph index to facilitate searching of the social graph. In some implementations, the event is stored in the social graph in accordance with a format that defines events in terms of ACTIONS, ACTORS, and OBJECTS. The social graph may then be queried using a graph query language in terms of objects that have been acted upon by specific actors in accordance with specific actions. Other ways to store events in the social graph are possible and may be considered within the scope of the disclosure.

In some implementations, an enterprise-wide graph is maintained and events can be stored in the enterprise-wide graph in addition to the social graph in a user's working set. In this manner, events that qualify for inclusion in a user's personalized working set can also be included in a wider graph.

In various implementations, some working set agents may be deployed in client applications. Thus, the working set agents may monitor for the events to occur in the application services, in the client applications, or both, based at least in part on the working set model.

In some scenarios, in response to one of the events occurring in one of the application services, a corresponding one of the working set agents may determine if the one of the events belongs in an additional working set specific to an additional user. Under such circumstances, the working set agent can nominate the event for inclusion in the working set for the user and for inclusion in an additional working for the additional user.

A variety of content may be included in the content database, such as documents, email, blog posts, and chat communications. Examples of the application services include a document service, an email service, a blog service, and a chat service. Examples of the client applications include a document application, an email application, and a blogging application, and a chat application.

The working set model in some scenarios may be updated based at least in part on the events nominated by the working agents for inclusion in the working set. The updates to the working set model may then be communicated to the working set agents for application in the application services. In an example, a user may become connected with a new user by way of an email, at which time the email event may nominated for inclusion in the user's working set. The working set model for the user can be updated to reflect the new relationship between the user and the new user such that other events involving at least the new user may be nominated for inclusion in the user's working set. In some implementations, an enterprise graph associated with many enterprise users may be updated.

In some implementations, a request to perform a search associated with the user may be initiated from any of the client applications. In response, at least a portion of the working set may be for searched results prior to expanding the search beyond the working set. For instance, a search query may specify a particular subject. A user's working set can be searched first for content relevant to the subject, followed by a wider search.

The size of a user's working set may be finite in some scenarios. Thus, when a new event qualifies for inclusion in a working set, analysis may also be performed to determine which event or content to remove from the working set to make room for the new event. Such a determination may be made based on the user's working model.

Figure 3:
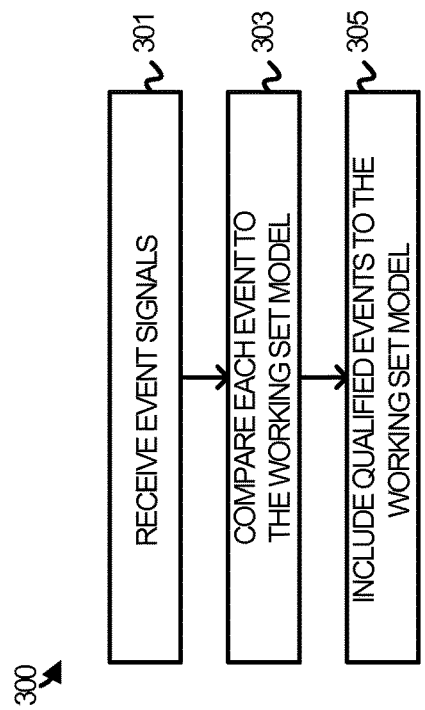
FIG. 3 illustrates a working set process employed by a working set service in an implementation.
Figure 2:
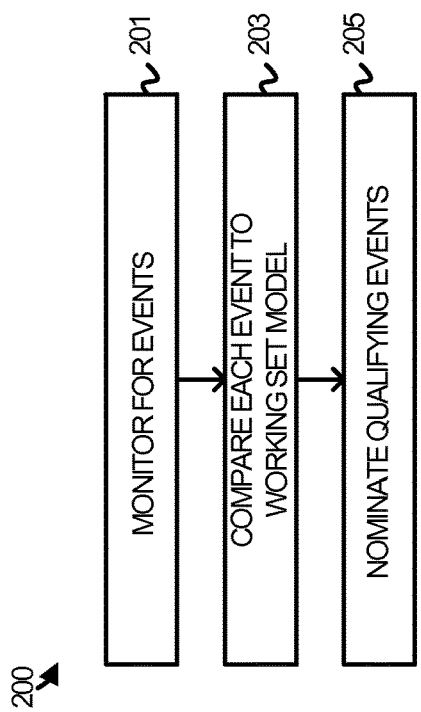
FIG. 2 illustrates a working set process employed by a working set agent in an implementation.
Figure 4:
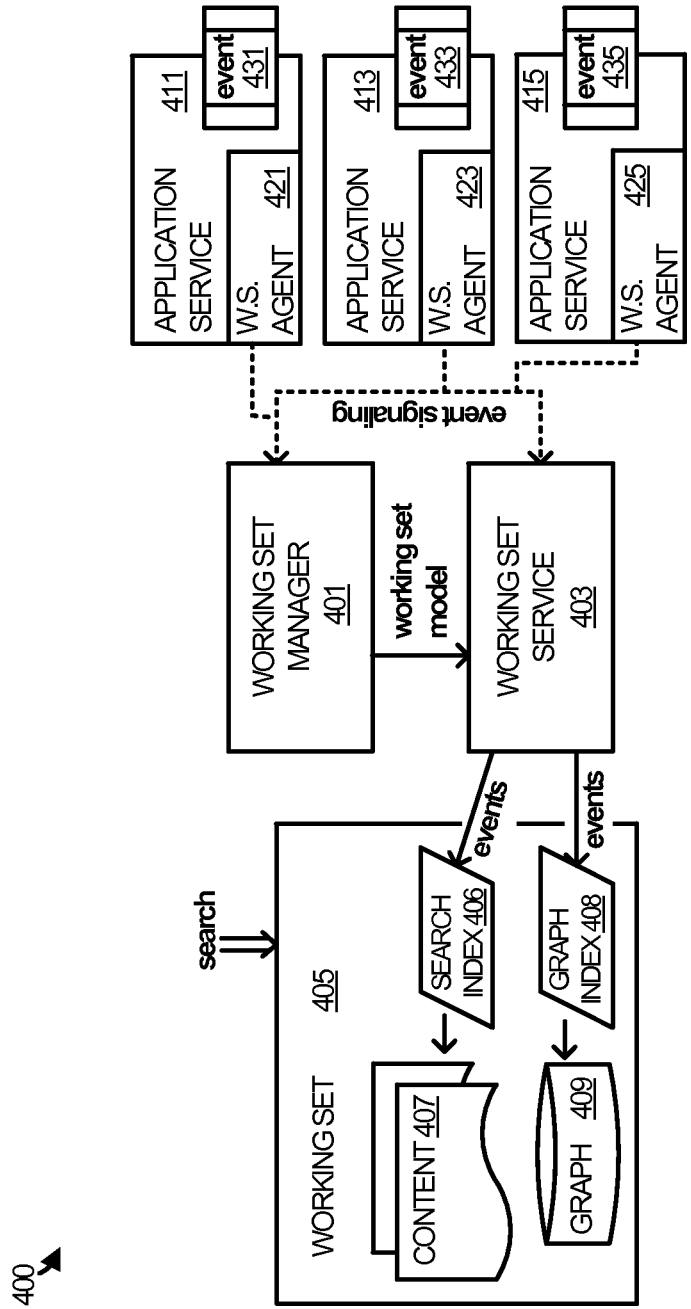
FIG. 4 illustrates an enhanced service environment in an implementation.
Figure 5:
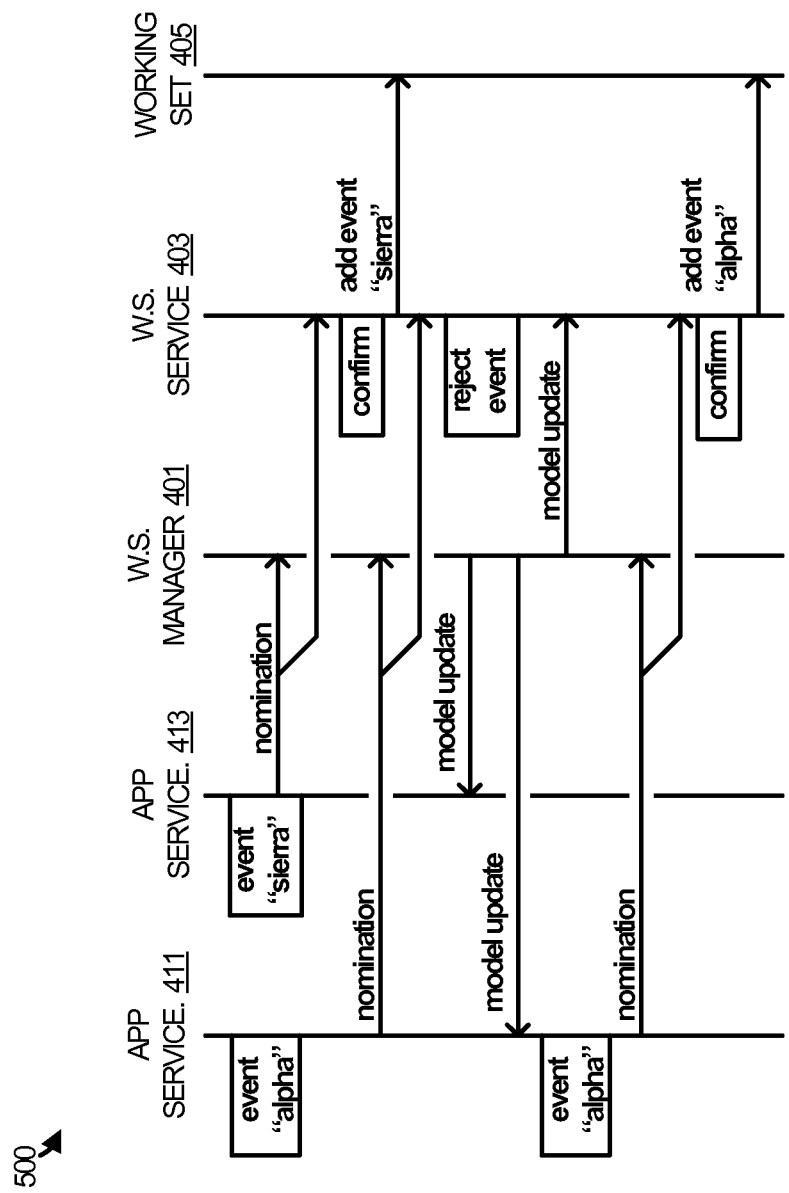
FIG. 5 illustrates an operational scenario in an implementation.
Figure 6:
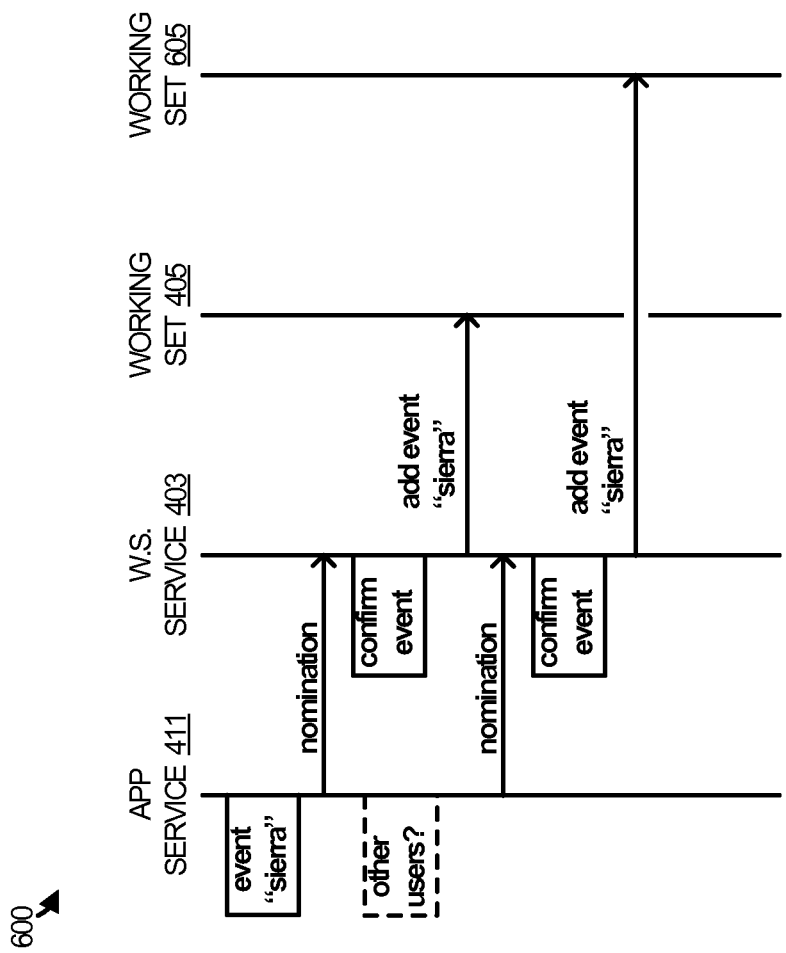
FIG. 6 illustrates an operational scenario in an implementation.
Figure 7:
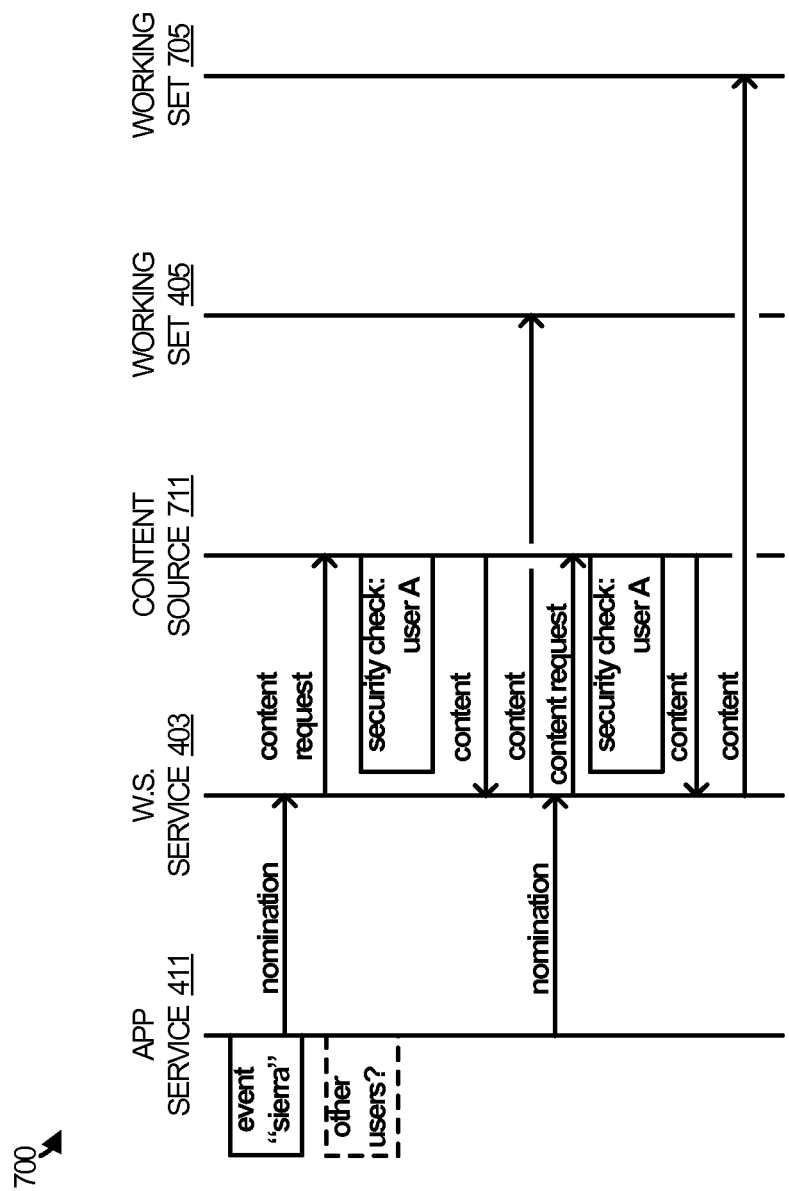
FIG. 7 illustrates an operational scenario in an implementation.

Referring now to the drawings, FIG. 1 illustrates an enhanced service environment in an implementation, while FIG. 2 and FIG. 3 illustrate two working set processes that may be employed in such an architecture. FIG. 4 illustrates another enhanced service environment and FIGS. 5-7 illustrate various operational scenarios that may occur. FIG. 8 illustrates a computing system representative of any system or systems with which all or portions of an enhanced service environment may be implemented.

Turning to FIG. 1, enhanced service environment 100 includes working set service 101, search service 110, application service 111, application service 113, and application service 115. Working set service 101 is operatively in communication with working set 103 and working set 105, while application service 111, application service 113, and application service 115 include working set agent 121, working set agent 123, and working set agent 125 respectively. Application services 111, 113, and 115 are operatively in communication with client environments 140. In some implementations, client environments 140 may also include working set agents 141.

Working set service 101 is representative of any software service, application, module, or collections thereof, in which working set process 300 may be employed to facilitate working sets and working set search. Working set process 300 is described in more detail below with respect to FIG. 3. Working set service 101 may be implemented in a stand-alone fashion or may be implemented with other environments in an integrated or cooperative fashion in order to facilitate working sets, such as working set 103 specific to user 143 and working set 105 specific to user 145.

Various types of physical or virtual computing systems may be used to implement working set process 300 within the context of working set service 101, such as server computers, desktop computers, laptop computers, tablet computers, smart phones, or any other suitable computing appliance, of which computing system 800, discussed below with respect to FIG. 8, is representative. When implemented using a sever computer, any of a variety of servers may be used including, but not limited to, application servers, database servers, mail servers, rack servers, blade servers, tower servers, or any other type server, variation of server, or combination thereof.

Application service 111, application service 113, and application service 115 each represent any software service, application, module, or collections thereof, in which a working set agent or collection of agents may be loaded and run, of which working set agent 121, working set agent 123, and working set agent 125 are representative. Examples of application services include, but are not limited to, productivity, communication, and gaming environments. Working set agent 121, working set agent 123, and working set agent 125 each represent any software application, software process, module, or component though which working set process 200 may be implemented in an application service to facilitate working sets and working set search.

Various types of physical or virtual computing systems may be used to implement application service 111, application service 113, and application service 115, of which computing system 800, discussed below with respect to FIG. 8, is representative. When implemented using a sever computer, any of a variety of servers may be used including, but not limited to, application servers, database servers, mail servers, rack servers, blade servers, tower servers, or any other type server, variation of server, or combination thereof.

Client environments 140 represent any software application, service, module, or component, or variation and combinations thereof, with which users 143, 145, and 147 may interface with in order to obtain access and interact with application services 111, 113, and 115. Examples include, but are not limited to, productivity applications, communication applications, web browsers, and gaming applications. Various types of physical or virtual computing systems may be used to implement client environments 140, such as server computers, desktop computers, laptop computers, tablet computers, smart phones, gaming appliances, or any other suitable computing appliance, of which computing system 800, discussed below with respect to FIG. 8, is representative.

In operation, users 143, 145, and 147 interact with client environments 140 to drive operations with respect to application services 111, 113, and 115. For example, users 143, 145, and 147 may interact with their email, compose or read documents, post on blogs, engage in instant messaging sessions, or otherwise perform any number of actions using client environments 140 to interact with application services 111, 113, and 115.

In the context of such operations, application services 111, 113, and 115 function to carry out some aspect or aspect of various applications or application services. For example, an email environment may provide aspects of an email service, a productivity environment may provide aspects of productivity services, and so on. As the functions and features of an application or service are carried out, events occur on a continuous basis, of which event 131, event 133, and event 135 are representative. This may be especially evident in the context of an enterprise in which many users interact regularly with application services 111, 113, and 115. For example, many users may interact with an email service to conduct email operations or with a document storage service to conduct document storage operations. A wide variety of applications, services, and operations are possible and may be considered within the scope of the present disclosure.

Examples of events 131, 133, and 135 occur include when emails are sent, received, forwarded, and read, or productivity documents created, authored, modified, shared, or read. In a specific example of an event, a colleague of a user may share a link to a document with the user by email. In another specific example, a colleague may read a web page and post a blog entry about the web page. Note that an event need not directly involve an action by the user. Rather, actions or events may occur that involve other people that are related to the user in some fashion. Other types of events are possible and may be considered within the scope of this disclosure.

Further in operation, working set agents 121, 123, and 125 are loaded in application services 111, 113, and 115 respectively to perform working set process 200 with respect to the events 131, 133, and 135 that are occurring. Any given working set agent may operate in any given application service on behalf of a single user. For example, working set agents 121, 123, and 125 may all operate in their respective application service on behalf of only one and the same user, such as user 143. Thus, it may be appreciated that more than one working set agent may be instantiated and run in any given application service, even though a one-to-one ratio is illustrated in FIG. 1 for purposes of clarity. Alternatively, any given working set agent may operate on behalf of multiple users at the same time. For example, working set agents 121, 123, and 125 may all operate in their respective application service on behalf of all of users 143, 145, and 147.

Regardless of whether a working set agent operates on behalf of one or multiple users, the working set agents 121, 123, and 125 operate on a per-user basis to facilitate user-specific working sets based on user-specific working set models. That is, regardless of whether or not one agent is used or multiple agents are used within a given application service, events are nominated for inclusion in working sets specific to users based on working set models specific to the users. Working set process 200, illustrated in FIG. 2, is representative of one such process that may be employed by each of working set agents 121, 123, and 125 to facilitate user-specific working sets.

Referring to the steps of working set process 200 parenthetically, working set agents 121, 123, and 125 continuously monitor for events to occur in application services 111, 113, and 115 (step 201). The events are examined and compared against the working set or working sets of a user or users to determine whether or not to include any of the events in any particular working set (step 203). For instance, a user's working set model may define qualifying events based on their type, their content, their subject matter, or based on the identity of people or actors associated with the events, as well as any combination or variation thereof. Other criteria or characteristics are possible and may be considered within the scope of the present disclosure. For any events that qualify for inclusion in the working set or working sets associated with a user or users, working set agents 121, 123, and 125 communicate event signaling to working set service 101 to nominate the events for inclusion in a working set or working sets associated with a user or user (step 205). The event signaling may be accomplished by a discrete message or messages indicative of an event, a flag or value set in a database indicative of an event, or some other mechanism suited to signaling the occurrence of a qualifying event to working set service 101.

Referring now to working set process 300 illustrated in FIG. 3, working set service 101 receives the event signals communicated by application services 111, 113, and 115 (step 301). The events nominated by way of the event signals are compared by working set service 101 to the working set model specific to the user for which event was nominated (step 303). Working set service 101 applies the working set model in order to confirm that an event warrants inclusion in the working set for a user. This may be useful in cases where the working set applied by any of the working set agents 121, 123, and 125 for a user diverges from that applied by working set service 101 for the same user. In some scenarios, the working sets may not diverge relative to each other. However, in other scenarios the various versions or instances of a working set model for a user may diverge from each other due to modifications made in operation. For example, working set agents 121, 123, and 125 may be capable of modifying their instance of the working set model for a user based on local behavior that they observe. In another case, one model may be updated while another model fails to update, is unavailable for update, or is not updated for some other reason.

For the nominated events that are confirmed by working set service 101, the events are included in the appropriate working set specific to each user for which the events were nominated (step 305). Including an event in a working set may be accomplished in a variety of ways, such as by updating a graph to reflect a new edge representative of an event, updating a content database with content associated with an event, or the like.

Referring back to FIG. 1, one particular operational scenario that may be implemented is illustrated with respect to enhanced service environment 100. In this scenario, users 143, 145, and 147 interact via client environments 140 in the context of using various applications or application services provided by application services 111, 113, and 115. To facilitate the services, client environments 140 and application services 111, 113, and 115 perform various operations with respect to each other. The operations may results in the occurrence of specific events monitored by working set agents 121, 123, and 125. Event 131 is triggered in application service 111, event 133 is triggered in application service 113, and event 135 is triggered in application service 115.

In response to detecting the events, working set agents 121, 123, and 135 analyze the events based on a working set model for a user (or multiple working set models for multiple users) to determine which, if any, of the events qualify for inclusion in a user-specific working set. It is assumed here for exemplary purposes that event 131 qualifies for inclusion in the working set 103 associated with user 143, event 133 qualifies for inclusion in working set 103 and in the working set 105 associated with user 145, and event 135 qualifies for inclusion in working 105. Accordingly, event signals are communicated to working set service 101 nominating the events for consideration.

Working set service 101 receives the event signals and analyzes each event nominated by the signals in view of the working set model specific to the user on behalf of whom the event was nominated. For instance, working set service 101 analyzes event 131 in view of the working set model for user 143. Event 133 is also analyzed based on the working set model for user 145, although it may be appreciated that event 133 could be included in one user's working set and not another's. Event 135 is analyzed in view of the working set model for user 145. It is assumed here for exemplary purpose that all three events 131, 133, and 135 qualify for inclusion in the working set for which they were nominated. Working set 103 is thus modified to include event 131 and event 133, while working set 105 is modified to include 133 and event 135.

FIG. 4 illustrates enhanced service environment 400 in an implementation. Enhanced service environment 400 includes working set manager 401, working set service 403, working set 405, application service 411, application service 413, and application service 415. In addition, enhanced service environment 400 includes working set agent 421, working set agent 423, and working set agent 425 running within application service 411, application service 413, and application service 415 respectively.

Working set agents 421, 423, and 425 are operatively in communication with working set manager 401 and working set service 403. Working set service 403 is also operatively in communication with working set 405 and working set manager 401. Working set 405 includes a search index 406 to content 407 and a graph index 408 to graph 409. Working set manager 401 and working set service 403 may each be implemented using any suitable computing system or systems, of which computing system 800 is representative.

Working set manager 401 is representative of any service capable of generating and updating working set models specific to users. The working set models and updates may be communicated to working set service 403 and working set agents 421, 423, and 425 to be applied against various events that occur in application services 411, 413, and 415. Working set service 403 is representative of any service capable of receiving and examining nominated events 431, 433, and 435 for inclusion in at least working set 405. Working set 405 is representative of working set information specific to one particular user. Other working sets specific to other users may be included in enhanced service environment 400. Content 407 is representative of any content that may be retrieved and stored in working set 405. Content 407 may include pointers to other content external to working set 405. Graph 409 may be a graph of content 407 that is representative of the relationships between the various content items in content 407. For instance, content 407 may include a variety of documents while graph 409 may include information representative of which actors sent which of the documents to which other actors. Other relationships are possible and may be considered within the scope of this disclosure.

Application services 411, 413, and 415 may each be representative of any service within which working set agents 421, 423, and 425 may be loaded and run. Examples of such application services include productivity application services, email services, blogging services, micro-blogging services unified communication services, instant messaging services, short-message services, collaboration services, or any other suitable service, variation of a service, or combinations thereof. Some commercial examples include, but are not limited to, Microsoft® Exchange®, Microsoft® SharePoint®, Microsoft® Lync®, Microsoft® Office 365®, and Yammer®, as well as any combination or variation thereof. Application services 411, 413, and 415 may each be implemented on any physical or virtual computing system or collection of systems, of which computing system 800 is representative.

FIG. 5 illustrates an operational scenario 500 involving enhanced service environment 400 in an implementation. In operation, an event "alpha" occurs in application service 411. Working set agent 421, in response to detecting and analyzing the events, communicates event signaling to working set manager 401 and working set service 403 nominating the event for inclusion in working set 405. At or near the same time, an event "sierra" occurs in application service 413. Working set agent 423 responsively communicates event signaling to working set manager 401 and working set service 403 nominating the event for inclusion in working set 405.

Working set service 403 examines both events based on a working set model specific to a user to determine whether or not to include the events in working set 405. In the case of event "sierra," the event is added to working set 405.

However, event "alpha" is rejected. In other words, while working set agent 421 deemed event "alpha" qualified for inclusion in working set 405 based in its version of the working set model associated with the user, working set service 403 concluded differently and rejected event "alpha." Furthermore, working set service 403 concludes to accept event "sierra". As such, event "sierra" is added to working set 405.

Adding the event to working set 405 may be accomplished by adding the event to content 407, in which case search index 406 is also modified to reflect the presence of any content item associated with the event in content 407. In various scenarios, the item may be a document, photo, transcript, media file, contact, or some other related content. The event may also be added to the graph 409 and reflected in graph index 408. Content 407 and graph 409 may then be searched via search index 406 and graph index 408 respectively. Content 407 and graph 409 may be searched from, for example, a stand-alone search service, a desktop search tool, a search tool integrated into an application service, or any other type of search tool or search service.

Working set manager 401 also processes and examines the events, but for purposes of generating or maintaining working set models. In this scenario, working set manager 401 communicates an update to the user's working set model to application service 411 and application service 413, as well as working set service 403.

Subsequent to updating the working set model, event "alpha" occurs again. Working set agent 421, running in application service 411, detects the event and nominates it for inclusion in working set 505. Working set service 403 receives the associated event signaling and evaluates the event itself based on the updated working set model. In this instance, the event is confirmed for inclusion in working set 505 and is added accordingly.

FIG. 6 illustrates operational scenario 600 in another implementation of enhanced service environment 400. In operation, working set agent 421 running in application service detects the occurrence of event "sierra," in response to which it nominates the event for inclusion in working set 405. Working set service 403 examines the nominated event based on a working set specific to a user and, in this case, adds it to working set 405.

In addition to these operations, working set agent 421 in this implementation also determines whether or not event "sierra" qualifies for inclusion in the working set associated with any other user. In this example, working set agent 421 identifies another user and nominates the event for inclusion in working set 605 associated with the other user. Working set service 403 evaluates the event itself and confirms that it can be added to working set 605. Thus, event "sierra" is added to both working set 405 specific to one user and working set 605 specific to another.

FIG. 7 illustrates operational scenario 700 in which a security check is performed against content before it is added to a working set. In operation, event "sierra" occurs in application service 411. Working set agent 421 sees the event and evaluates it against a working set specific to a user. Upon determining that the event qualifies for inclusion in the user's working set, working set agent 421 nominates the event by way of event signaling. Working set service 403 receives the event signaling and evaluates the event itself to confirm that it may be included in working set 405.

In this scenario, it is assumed for exemplary purposes that the event qualifies. As such, working set service 403 requests content associated with the event from content source 711. Content source 711 performs a security check against the content to assess whether or not the user is allowed to access the content. The security check may be performed based on credentials associated with the user or any suitable security mechanism. If the user is allowed access, then the content is retrieved from content source 711 and provided to working set service 403 for inclusion in working set 405 associated with the user.

Further in this scenario, working set agent 421 running in application service 411 determines that the event "sierra" may also be included in another working set 605 associated with another user. Working set agent 421 communicates with working set service 403 to nominate the event, in response to which working set service 403 performs its own analysis. It is assumed here that the event qualifies for inclusion in working set 705.

Working set service 403 requests the content from content source 711, but this time for inclusion in working set 705 which is specific to a different user than working set 405. Accordingly, content source 711 performs a security check to assess whether or not the other user is allowed access to the content. For exemplary purposes, it is determined that the user is allowed access to the content, at which point the content is communicated to working set service 403. Working set service 403 receives the content and includes it in working set 705. In this manner, the content is retrieved and stored in both working sets 405 and 705 and can be searched and retrieved without having to perform a security check at that time.

In some implementations, graph 409 may be searchable for content or objects based how they are connected to actors in terms of actions. In an enterprise setting, a user may interact with many different services, examples of which include email, document and file management services, contact managers, instant messaging applications, and telecommunication services, to name just a few. The graph 409 can be queried on the basis of which actors performed specific actions on any kind of objects. For example, a user interfacing with a search service may form a query directed to graph 409 that asks for any objects acted upon by a specific actor in accordance with a specific action. The graph 409 can be searched for objects that satisfy such a graph query expression. The qualifying objects, or information indicative of them, can be returned in response to the query. In some implementations, the results of the graph search may be combined with or refined in view of results from other searches, such as a full-text search or another graph search.

Graph 409 can thus be queried in some scenarios for documents, emails, blog posts, or any other relevant objects acted upon in a specific way by a specific actor. For instance, a query may ask for any objects authored by a particular person. Such queries may follow a syntax that describe relationships in terms of actor-action-object triplets. In some implementations, an ACTOR operator may be employed to call a search function that examines an enterprise graph for all actions of an actor that satisfy a filter defined associated with the operator. The filter may name the actor and the action such that any related objects can be found. In some implementations a RANK operator may be supported to rank results returned by the ACTOR operator. Boolean logic can be included to further narrow or filter search results. For example, an enterprise graph may be queried for any objects authored by one person and modified by another. Any Boolean operated may be supported, including AND, OR, and ANDNOT).

All or portions of enhanced service environment 100 may be implemented on any suitable computing system or collection of computing systems, of which computing system 800 is representative. All or portions of enhanced service environment 400 may also be implemented on any suitable computing system or collection of systems, of which computing system 800 is also representative.

Referring to FIG. 8, computing system 800 is representative of any computing system suitable for implementing all or portions of enhanced service environments 100 and 400, working set processes 200 and 300, and optionally any of the other operational scenarios and examples described herein. Examples of computing system 800 include server computers, rack servers, application servers, cloud computing platforms, and data center equipment, as well as any other type of physical or virtual server machine, and any variation or combination thereof. In some implementations, a collection of multiple computing systems may be employed to implement all or portions of enhanced service environments 100 and 400, working set processes 200 and 300. In some scenarios, all or portions of enhanced service environments 100 and 400 may be hosted in one or more data centers, virtual data centers, or any other suitable computing facilities.

Enhanced service environments 100 and 400 may be hosted in a multi-tenant environment, in a single tenant-environment, or in some other tenancy arrangement in which an enterprise obtains the services from a service provider. In other scenarios, an enterprise may host enhanced service environments 100 and 400 in its own facility. Other provisioning arrangements are possible and may be considered within the scope of this disclosure.

While typically representative of a server or collection of servers on which enhanced service environments 100 and 400 may be implemented, computing system 800 is also representative of any computing system suitable for implementing client environments 140 or any other client environment capable of interfacing with enhanced service environments 100 and 400. Examples of such computing systems include, but are not limited to, desktop computers, laptop computers, tablet computers, notebook computers, mobile computing devices, cell phones, media devices, and gaming devices, as well as any other type of physical or virtual computing machine and any combination or variation thereof, of which computing system 800 is also representative.

Computing system 800 may be implemented as a single apparatus, system, or device or may be implemented in a distributed manner as multiple apparatuses, systems, or devices. Computing system 800 includes, but is not limited to, processing system 801, storage system 803, software 805, communication interface system 807, and user interface system 809, which is optional. Processing system 801 is operatively coupled with storage system 803, communication interface system 807, and user interface system 809. Processing system 801 loads and executes software 805 from storage system 803. When executed by processing system 801, software 805 directs processing system 801 to operate as described herein for enhanced service environments 100 and 400 and working set processes 200 and 300 and their variations, or as described herein for any of the operational scenarios and examples disclosed herein. Computing system 800 may optionally include additional devices or functionality not discussed for purposes of brevity.

Referring still to FIG. 8, processing system 801 may comprise a microprocessor and other circuitry that retrieves and executes software 805 from storage system 803. Processing system 801 may be implemented within a single processing device but may also be distributed across multiple processing devices or sub-systems that cooperate in executing program instructions. Examples of processing system 801 include general purpose central processing units, application specific processors, and logic devices, as well as any other type of processing device, combinations, or variations thereof.

Storage system 803 may comprise any computer readable storage media readable by processing system 801 and capable of storing software 805. Storage system 803 may include volatile and nonvolatile, removable and non-removable media implemented in any method or technology for storage of information, such as computer readable program instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 801 or possibly other systems.

Software 805 may be implemented in program instructions and among other functions may, when executed by processing system 801, direct processing system 801 or computing system 800 in general to operate as described herein for enhanced service environments 100 and 400 and working set processes 200 and 300 and their variations, and optionally as described with respect to the operational scenarios and examples disclosed herein. In particular, the program instructions may include various components or modules that cooperate or otherwise interact to carry out working set processes 200 and 300. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software or other application software. Software 805 may also comprise firmware or some other form of machine-readable processing instructions executable by processing system 801.

In general, software 805 may, when loaded into processing system 801 and executed, transform a suitable apparatus, system, or device (of which computing system 800 is representative) overall from a general-purpose computing system into a special-purpose computing system customized to facilitate user-specific working sets as described herein for each implementation. Indeed, encoding software 805 on storage system 803 may transform the physical structure of storage system 803. The specific transformation of the physical structure may depend on various factors in different implementations of this description. Examples of such factors may include, but are not limited, to the technology used to implement the storage media of storage system 803 and whether the storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Referring again to FIG. 1 and FIG. 4, through the operation of a computing system or systems of which computing system 800 is representative, transformations may be performed with respect to working set 103, working set 105, and working set 405. As an example, events occur that are nominated for inclusion in a working set or sets specific to a user. Upon qualifying, the events are added to the working sets, thereby transforming the working sets to a new, different state.

It may be understood that computing system 800 is generally intended to represent a computing system or systems on which software 805 may be deployed and executed in order to implement enhanced service environments 100 and 400 or working set processes 200 and 300. However, computing system 800 may also be suitable as any computing system on which software 805 may be staged and from where software 805 may be distributed, transported, downloaded, or otherwise provided to yet another computing system for deployment and execution, or yet additional distribution.

Communication interface system 807 may include communication connections and devices that allow for communication with other computing systems (not shown) over a communication bus, a communication network, or a collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 800 and any other computing system (not shown) may occur over a communication bus, network, or networks and in accordance with various communication protocols, combinations of protocols, or variations thereof. Examples of communication networks over which computing system 800 may exchange information with other computing systems include intranets, the Internet, local area networks, wide area networks, wireless networks, wired networks, virtual networks, software defined networks, data center buses, computing backplanes, networks, or any combination or variation thereof. The aforementioned communication networks and protocols are well known and need not be discussed at length here.

When applicable, user interface system 809 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 801 in support of the various user input and output devices discussed above. Separately or in conjunction with each other and other hardware and software elements, the user interface software and user interface devices may support a graphical user interface, a natural user interface, or any other type of user interface. For example, a search interface to a search service may be presented through user interface system 809.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for facilitating user-specific working sets comprising:

developing a user-specific working set model based on behavior of a user across a plurality of application services;

monitoring via a plurality of working set agents for events to occur in the plurality of application services, each application service for carrying out a service, wherein the plurality of working set agents operate on a per-user basis regardless of a number of users for which the plurality of working set agents operate on behalf of to assemble a user-specific working set of information for the user;

in response to the events occurring while carrying out services via the plurality of application services, the plurality of working set agents determining which of the events to nominate for inclusion in the user-specific working set of information to facilitate a search specific to the user;

receiving in a working set service a plurality of event signals initiated by the plurality of working set agents indicative of the events being nominated by the plurality of working set agents for inclusion in the user-specific working set of information;

determining which of the events nominated by the plurality of working set agents qualify for inclusion in the user-specific working set of information based at least in part on the user-specific working set model;

for each event for inclusion in the user-specific working set of information, modifying the user-specific working set of information to include at least the event; and searching the user-specific working set of information for content relevant to a query from the user.

2. The method of claim 1 wherein the user-specific working set of information comprises a content database that includes content associated with the event and other content associated with other events included in the user-specific working set of information, and wherein the method further comprises performing a security check on the content prior to including it in the user-specific working set of information.

3. The method of claim 2 wherein the user-specific working set of information further comprises a graph index to a social graph of the user and wherein modifying the user-specific working set of information to include the event comprises modifying the user-specific working set of information to include the event in the social graph, performing a security check on the content to determine if the user is allowed to access the content, and modifying the content database to include the content associated with the event in the content database.

4. The method of claim 3 further comprising monitoring via the plurality of working set agents for the events to occur in the plurality of application services and in a plurality of client applications based at least in part on the user-specific working set model.

5. The method of claim 4 further comprising, in response to one of the events occurring in one of the plurality of application services, a corresponding one of the plurality of working set agents determining if the one of the events belongs in an additional working set of information specific to an additional user and if so, nominating the event for inclusion in the user-specific working set of information specific to the user and for inclusion in the additional working set of information specific to the additional user.

6. The method of claim 4 wherein the content database includes documents, email, blog posts, and chat communications, wherein the plurality of application services comprises a document service, an email service, a blog service, and a chat service, and wherein the plurality of client applications comprises a document application, an email application, and a blogging application, and a chat application.

7. The method of claim 1 further comprising generating updates to the user-specific working set model based at least in part on the events and communicating the updates to the plurality of working set agents.

8. The method of claim 1 further comprising receiving a request to perform a search associated with the user, and in response, searching at least a portion of the user-specific working set of information for search results prior to expanding the search beyond the user-specific working set of information.

9. One or more computer readable storage media having program instructions stored thereon to facilitate user-specific working sets and working set search that, when executed by a computing system, direct the computing system to at least:

develop a user-specific working set model based on behavior of a user across a plurality of application services;

monitor via a plurality of working set agents for events to occur in the plurality of application services, each application service for carrying out a service, wherein the plurality of working set agents operate on a per-user basis regardless of a number of users for which the plurality of working set agents operate on behalf of to assemble a user-specific working set of information for the user;

in response to the events occurring while carrying out services via the plurality of application services, the plurality of working set agents determine which of the events to nominate for inclusion in the user-specific working set of information;

receive from the plurality of working set agents in the plurality of application services a plurality of event signals indicative of the events being nominated for inclusion in the user-specific working set of information to facilitate a search specific to the user;

determine which of the events nominated by the plurality of working set agents qualify for inclusion in the user-specific working set of information based at least in part on the user-specific working set model;

for each event determined to qualify for inclusion in the user-specific working set of information, modify the user-specific working set of information to include at least the event; and search the user-specific working set of information for content relevant to a query from the user.

10. The one or more computer readable storage media of claim 9 wherein the user-specific working set of information comprises a content database that includes content associated with the event and other content associated with other events included in the user-specific working set of information, and wherein the user-specific working set of information further comprises a search index to the content database that is searchable from any of the plurality of application services.

11. The one or more computer readable storage media of claim 10 wherein the user-specific working set of information further comprises a graph index to a social graph of the user and wherein to modify the user-specific working set of information to include the event, the computing system modifies the user-specific working set of information to include the event in the social graph and the content associated with the event in the content database.

12. The one or more computer readable storage media of claim 11 wherein the plurality of working set agents monitor for the events to occur in the plurality of application services and in a plurality of client applications corresponding to the plurality of application services based at least in part on the user-specific working set model.

13. The one or more computer readable storage media of claim 12 wherein the content database includes documents, email, blog posts, and chat communications, wherein the plurality of application services comprises a document service, an email service, a blog service, and a chat service, and wherein the plurality of client applications comprises a document application, an email application, a blogging application, and a chat application.

14. The one or more computer readable storage media of claim 11 wherein the program instructions further direct the computing system to generate updates to the user-specific working set model based at least in part on the events and the social graph and communicate the updates to the plurality of working set agents and update an enterprise graph for a plurality of users in an enterprise based at least in part on the event.

15. The one or more computer readable storage media of claim 9 wherein the program instructions further direct the computing system to, in response to a request to perform a search associated with the user, search at least a portion of the user-specific working set of information for search results prior to expanding the search beyond the user-specific working set of information.

16. A system for facilitating user-specific working sets, the system comprising:
a processor; and
a memory coupled to the processor and storing instructions, that when executed by the processor, cause the processor to:
develop a user-specific working set model based on behavior of a user across a plurality of application services;
monitor via a plurality of working set agents residing in the plurality of application services for events to occur in the plurality of application services, each application service for carrying out a service, wherein the plurality of working set agents operate on a per-user basis regardless of a number of users for which the plurality of working set agents operate on behalf of to assemble a user-specific working set of information for the user;
in response to the events occurring while carrying out services via the plurality of application services, determine via the plurality of working set agents which of the events to nominate for inclusion in the user-specific working set of information to facilitate a search specific to the user and to communicate a plurality of event signals indicative of the events being nominated;
receive in a working set service the plurality of event signals indicative of the events nominated by the plurality of working set agents;
determine via the working set service which of the events nominated by the plurality of working set agents qualify for inclusion in the user-specific working set of information based at least in part on the user-specific working set model;
for each event determined to qualify for inclusion in the user-specific working set of information, modify via the working set service the user-specific working set of information to include at least the event;
identify via a working set manager updates to the user-specific working set model based at least in part on the plurality of event signals and a plurality of previously received event signals, wherein the updates to the user-specific working set model are communicated at least to the plurality of working set agents and the working set service; and
search via a search service the user-specific working set of information for content relevant to a query from the user.

17. The system of claim 16 wherein the user-specific working set of information comprises a content database that includes content associated with the event and other content associated with other events included in the user-specific working set of information, and wherein the user-specific working set of information further comprises a search index to the content database that is searchable from any of the plurality of application services.

18. The system of claim 17 wherein the user-specific working set of information further comprises a graph index to a social graph for the user and wherein to modify the user-specific working set of information to include the event, the working set service modifies the user-specific working set of information to include the event in the social graph and the content associated with the event in the content database.

19. The system of claim 18 wherein the content database includes documents, email, blog posts, and chat communications, wherein the plurality of application services comprises a document service, an email service, a blog service, and a chat service.

20. The system of claim 19, wherein the processor is further operative to, in response to a request to perform a search associated with the user, search via the search service at least a portion of the user-specific working set of information for search results prior to expanding the search beyond the user-specific working set of information and wherein:
the user-specific working set model comprises event criteria against which to compare each of the events for inclusion in the user-specific working set of information, wherein the event criteria comprises a social relevance to the user of any of the events and a subject matter relevance to the user of any of the events.

* * * * *